J. B. Seymour.
Hand Seeder.
No. 69,130.   Patented Sep. 24, 1867.
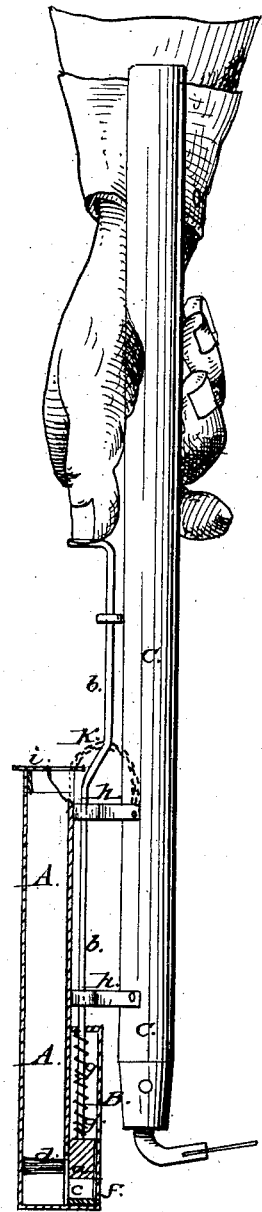
WITNESSES:
Theo. Tysche
J. A. Service
INVENTOR:
Jno. B. Seymour
Per Munn & Co.
Attorneys

United States Patent Office.

JOHN B. SEYMOUR, OF PITTSBURG, PENNSYLVANIA.

Letters Patent No. 69,130, dated September 24, 1867; antedated September 7, 1867.

IMPROVEMENT IN SEED-PLANTER.

*The Schedule referred to in these Letters Patent and making part of the same.*

TO ALL WHOM IT MAY CONCERN:

Be it known that I, JOHN B. SEYMOUR, of Pittsburg, in the county of Allegheny, and State of Pennsylvania, have invented a new and improved Seed-Planter; and I do hereby declare that the following is a full, clear, and exact description thereof, which will enable others skilled in the art to make and use the same, reference being had to the accompanying drawings, forming part of this specification.

The object of this invention is to construct a simple and adjustable seed-planter, which may be attached to the handle of a hoe, or to ploughs or harrows, as may be desired.

The invention consists in the use of a spring, whereby the rod for operating the plunger or seed-distributor is brought back into its original position after having been pushed down, so that thereby only half a stroke is to be made by hand, the spring doing the other half. In the annexed drawing, which represents a side view, partly in section, of a hoe, to which my improved seed-planter is attached, my invention is illustrated.

A is an oblong box, made of sheet metal, wood, or any other suitable material, to the side of which, near its lower end, is secured a smaller box, B, which may also be made of wood or sheet metal, or other suitable material. Within the box B is arranged a plunger, $a$, which can be moved up and down by means of a rod, $b$. A hole, $c$, is arranged through the plunger $a$, as shown, the side of which may be regulated, at will, to hold more or less grains of corn or other article to be planted. Above the bottom of the box A is arranged a cut-off, $d$, which may be made of bristles, gum-elastic, or other suitable material. Through an opening, $e$, close above the cut-off, in the wall between the chambers A and B, the seed drops into the hole in the plunger $a$; the latter is then pushed down, and carries the seed down, the brush $d$ preventing any more from falling in after it has passed, and the seed then drops through a hole, $f$, in or near to the bottom of box B, to the ground. The plunger is operated by pressing on the rod $b$. As soon as the pressure is released, a spring, $g$, will throw the plunger up again. The plunger is long enough to close the hole $e$ when down, (see drawing,) so that the seed cannot drop into the box B. The device can be secured to the handle of a hoe, C, or to any other suitable apparatus, by means of arms $h\ h$. The lid $i$ of the box A can be removed, so as to fill the box A with fresh seed, and is prevented from getting lost by being attached to a chain, K, which is secured to A, as shown.

I claim as new, and desire to secure by Letters Patent—

A seed-planter, consisting of the boxes A and B, plunger $a$, rod $b$, spring $g$, and cut-off $d$, all made and operating substantially as herein shown and described.

JOHN B. SEYMOUR.

Witnesses:
PHILIP R. KINCAID,
T. J. DUNCAN.